United States Patent [19]

Al-Ofi

[11] Patent Number: 5,402,122
[45] Date of Patent: Mar. 28, 1995

[54] TPC RADIX CONVERTER

[76] Inventor: Moatad S. Al-Ofi, 4708 Chestnut St. Apt. 3C, Philadelphia, Pa. 19139

[21] Appl. No.: 134,938

[22] Filed: Oct. 13, 1993

Related U.S. Application Data

[60] Continuation of Ser. No. 917,397, Jul. 23, 1992, abandoned, which is a division of Ser. No. 789,410, Nov. 1, 1991, Pat. No. 5,181,186.

[51] Int. Cl.$^6$ .............................................. H03M 7/00
[52] U.S. Cl. ...................................................... 341/50
[58] Field of Search ....................... 341/50, 56, 83, 80, 341/105, 106, 102, 103; 364/780, 771

[56] References Cited

U.S. PATENT DOCUMENTS 3,678,459  7/1972  Grolitzer et al. .............. 340/825.53
3,700,872 10/1972  May ........................................ 341/56

*Primary Examiner*—Brian K. Young
*Attorney, Agent, or Firm*—Moatad Salem Al-Ofi

[57] ABSTRACT

A combinational circuit functioning as a TPC radix converter comprised from a TPC decoder connected to a TPC encoder for converting an operand from a TPC represented input in the form of n-digit by r-bit of a first number system of radix r to a TPC represented output in the form of p-digit by b-bit of a second number system of radix b has been disclosed.

5 Claims, 5 Drawing Sheets

TPC RADIX CONVERTER

This application is a continuation of application Ser. No. 07/917,397, filed Jul. 23, 1992, now abandoned, which is a division of application Ser. No. 07/789,410, filed Nov. 1, 1991, now U.S. Pat. No. 5,181,186.

BACKGROUND OF THE INVENTION

Information needs to be represented in a suitable form in order to be operated upon in a desired way. A coding system is one of such a suitable form. There is not yet a coding system that is good for all purposes and accordingly many coding systems are invented and correspondingly many manipulating in accordance machines are designed. Information represented according to a particular coding system may not be recognized and processed by a machine designed for manipulation according to a different coding system. Communications between one system and another are needed in many cases where code conversion is a must when coding system are not the same. Radix conversion is a very special case limited to number representations where radices are relevant. For example, the conversion of Roman numerals to and from Fibonacci code does not involve radix conversion. Radix conversion according to the conventional methods is equivalent basically to an evaluation of the formula $$N = \sum_{i=0}^{n-1} a_i r^i,$$

where N denotes a positive integer needs to be converted and $a_i$ is a digit of a number system of radix r. An evaluation of a formula of such type is not a simple task because it may involve all basic arithmetic operations addition, subtraction, multiplication and division.

SUMMARY OF THE INVENTION

The complexity implied by the evaluation of the above-mentioned formula adopted in conventional radix conversion methods is avoided altogether in this invention. Instead of the principle that radix conversion is an evaluation of a formula of the type mentioned-above, followed conventionally, this invention is based on that radix conversion is simply a decoding-encoding procedure and accordingly the radix converter of this invention is precisely a TPC decoder connected to a TPC encoder. The only requirement is that decoding and encoding processes of this invention need to be upon operands in TPC representations. How an operand may be represented in a TPC form is fully explained in the cited above parent application.

DESCRIPTION OF THE INVENTION

As explained in the Text Book [Mano, M. M., Digital Logic and Computer Design, Englewood Cliffs, N.J., Prentice-Hall, 1979], a combinational circuit is fully specified by its input-output(I/O) relations. It is stated there that I/O relations and logic diagrams are two equivalent expressions concerning combinational circuits. This is part of the fact stating that calculus of propositions and combinational (relays and switching) circuits are equivalent discovered by the American mathematician Claude E. Shannon in 1938, [Shannon, C. E., A Symbolic Analysis of Relay and Switching Circuits, Transaction of the AIEE, Vol. 57, pp. 713-723, 1938 ]. All the circuits of this invention are combinational circuits precisely specified by their associating input-output relations.

Figure 1:
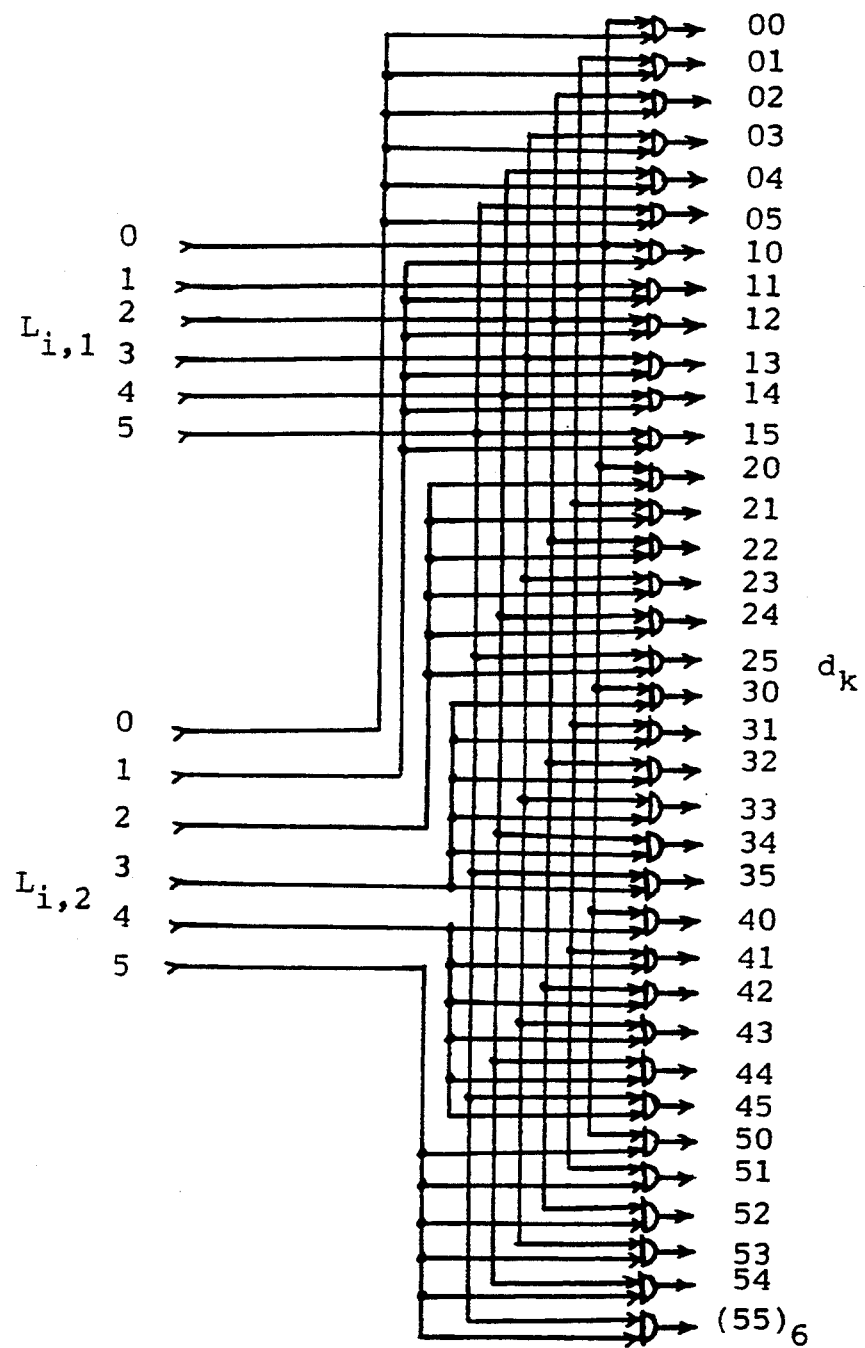
FIG. 1 is a logic diagram of a combinational circuit of a TPC decoder(DR) for the case n=2 and r=6.

FIG. 1 is a combinational circuit for a TPC decoder drawn according to the following I/O relations for the case n=2 and r=6:

$$d_k = \prod_{j=1}^{n} L_{ij} \text{ such that } i_n \ldots i_2 i_1 = k \qquad (1)$$

where the multiplication sign "$\pi$" denotes AND operator, $L_{ij}$ for $i_j=0, 1, \ldots, r-1$ denotes the inputs, r is an integer greater than 1 denotes the radix of a given number system, n is a positive integer denotes how many digits of radix r each is the width of a given input and $d_k$ for $k=0, 1, \ldots, r^n-1$ denotes the outputs. For the given case ( i.e., for the case n=2 and r=6), relations (1 ) are as follows:

| | | | |
|---|---|---|---|
| $d_{00} = L_{02}L_{01}$ | $d_{13} = L_{12}L_{31}$ | $d_{30} = L_{32}L_{01}$ | $d_{43} = L_{42}L_{31}$ |
| $d_{01} = L_{02}L_{11}$ | $d_{14} = L_{12}L_{41}$ | $d_{31} = L_{32}L_{11}$ | $d_{44} = L_{42}L_{41}$ |
| $d_{02} = L_{02}L_{21}$ | $d_{15} = L_{12}L_{51}$ | $d_{32} = L_{32}L_{21}$ | $d_{45} = L_{42}L_{51}$ |
| $d_{03} = L_{02}L_{31}$ | $d_{20} = L_{22}L_{01}$ | $d_{33} = L_{32}L_{31}$ | $d_{50} = L_{52}L_{01}$ |
| $d_{04} = L_{02}L_{41}$ | $d_{21} = L_{22}L_{11}$ | $d_{34} = L_{32}L_{41}$ | $d_{51} = L_{52}L_{11}$ |
| $d_{05} = L_{02}L_{51}$ | $d_{22} = L_{22}L_{21}$ | $d_{35} = L_{32}L_{51}$ | $d_{52} = L_{52}L_{21}$ |
| $d_{10} = L_{12}L_{01}$ | $d_{23} = L_{22}L_{31}$ | $d_{40} = L_{42}L_{01}$ | $d_{53} = L_{52}L_{31}$ |
| $d_{11} = L_{12}L_{11}$ | $d_{24} = L_{22}L_{41}$ | $d_{41} = L_{42}L_{11}$ | $d_{54} = L_{52}L_{41}$ |
| $d_{12} = L_{12}L_{21}$ | $d_{25} = L_{22}L_{51}$ | $d_{42} = L_{42}L_{21}$ | $d_{55} = L_{52}L_{51}.$ |

Relations (1) are obtained according to the following procedure:

ALGORITHM 1: A design procedure for a TPC decoder

1. Write down the integers 0 through $r^n-1$ consecutively, where r denotes the radix of the given system and n denotes the width of the given input measured in digits of radix r each;
2. For each integer of step 1 let there be a corresponding AND gate; and
3. Connect-the input lines(there are rn as many) to the AND gates of step 2 as indicated by integers of step 1. FIG. 1 shows direct application for algorithm 1.

Figure 2:
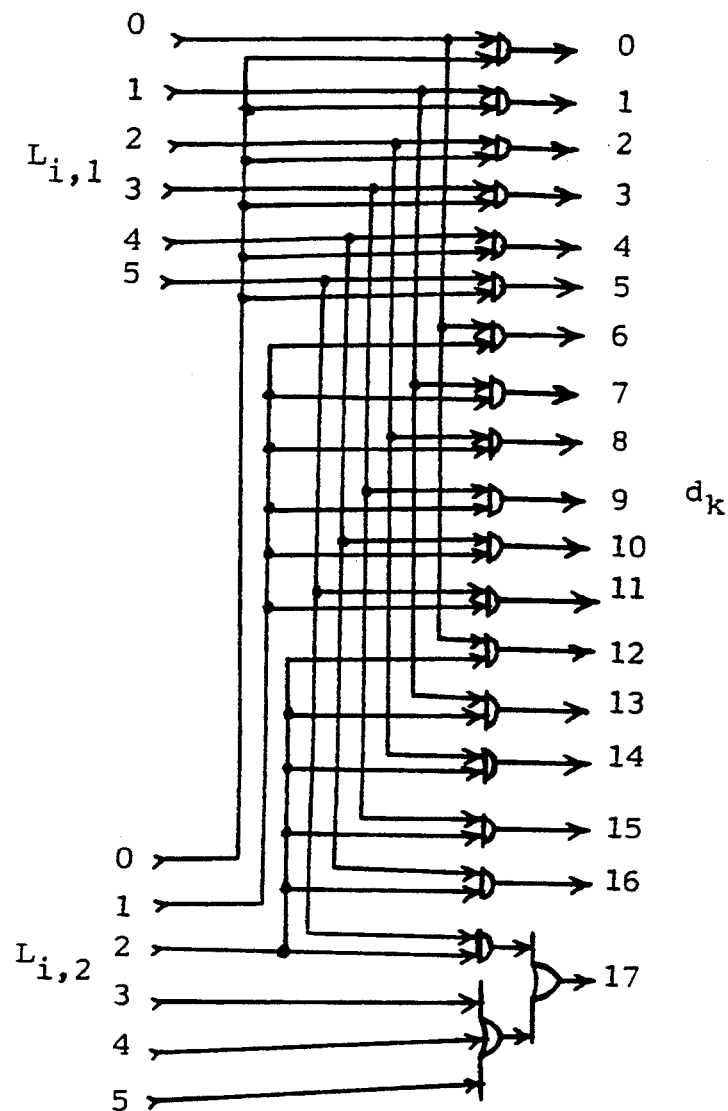
FIG. 2 is a logic diagram of a combinational circuit of a TPC trimmed decoder(TD) for the case n=2, r=6 and m=17.

FIG. 2 is a combinational circuit for a TPC trimmed decoder drawn according to the following I/O relations for the case n=2, r=6 and m=17:

$$d_k = \begin{bmatrix} \prod_{j=1}^{n} L_{ij} \text{ such that } i_n \ldots i_2 i_1 = k < m \\ \prod_{j=1}^{n} L_{ij} + \sum_{j=m}^{n} \sum_{i=0}^{r-1} L_{ij} \text{ such that } i_n \ldots i_2 i_1 = k \geq m \\ k = m \quad k > m \end{bmatrix} \quad (2)$$

where multiplication and summation signs denote AND and OR operators respectively; $L_{ij}$, $d_k$, $i_j$, k, r and n are as defined for relations (1); and m is a positive integer. The difference between the decoder of FIG. 1 and the trimmed decoder of FIG. 2 is that all the outputs correspond to a number greater than a given positive integer m are not required in case of the trimmed decoder and accordingly ORed with the nearest output correspond to the given positive integer m.

Figure 3:
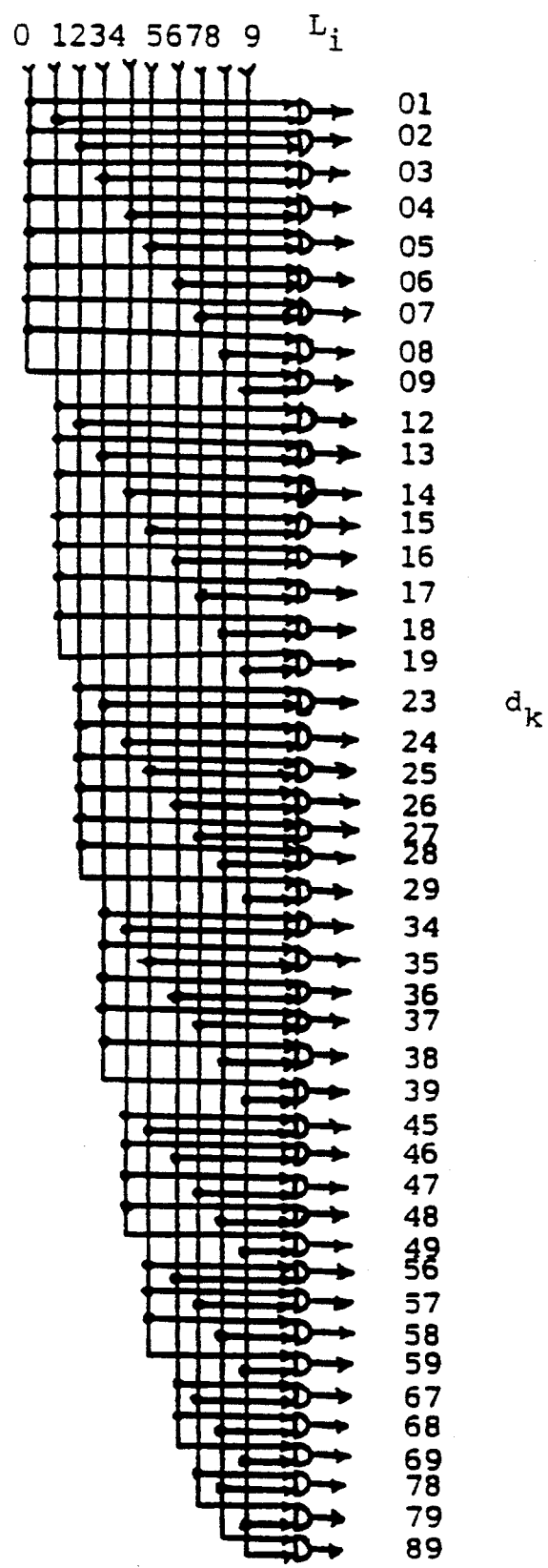
FIG. 3 is a logic diagram of a combinational circuit of a c-out-of-r decoder(CDR) for the case c=2 and r=10.

FIG. 3 is a combinational circuit for a c-out-of-r decoder drawn, for the case c=2 and r=10, according to the following I/O relations:

$$d_k = \prod_{j=1}^{c} L_{ij} \text{ such that } k \text{ is a combination of } (0, 1, \ldots, r-1) \text{ taken } c \text{ at a time} \quad (3)$$

where the multiplication sign denotes AND operator, c is a positive integer less than r, and r, $d_k$, $L_{ij}$ and $i_j$ are as defined for relations (1). For the given case c=2 and r=10, there are ten inputs $L_i$ and $r!/c!(r-c)!=45$ outputs $d_k$ as shown in FIG. 3, where "!" denotes factorial operator, e.g., $4!=4\times3\times2\times1=24$. The circuit of FIG. 3 can be drawn according to ALG. 1 where the integers of step 1 are the combinations of $(0, 1, \ldots, r-1)$ taken c at a time.

Figure 4:
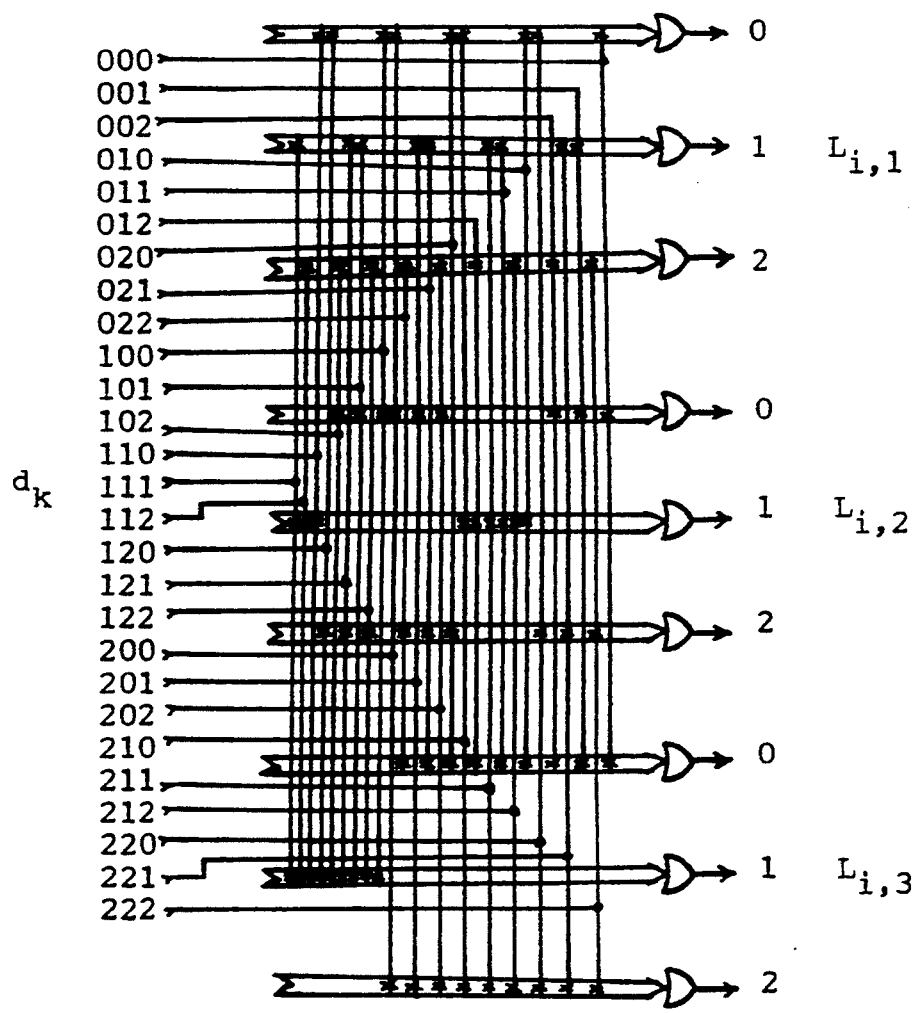
FIG. 4 is a logic diagram of a combinational circuit of a TPC encoder (ER) for the case n=3 and r=3.

FIG. 4 is a combinational circuit for a TPC encoder drawn, for the case r=3 and n=3, according to the following I/O relations:

$$L_{ij} = \sum_k d_k \text{ such that } k \text{ is an integer between 0 and } r^n - 1, \text{ included, in which } i \text{ is a digit in position } j \quad (4)$$

where the summation sign denotes OR operator, $L_{ij}$ for $i=0, 1, \ldots, r-1$ and $j=1, 2, \ldots, n$ denotes the output, $d_k$ for $k=0, 1, \ldots, r^n-1$ denotes the input, r is a positive integer greater than 1 denotes the radix of a given number system, and n is a positive integer denotes the width of the output measured in digits of radix r. For the given case (i.e., for r=3 and n=3), relations (4) are as follows:

$L_{01} = d_{000} + d_{010} + d_{020} + d_{100} + d_{110} + d_{120} + d_{200} + d_{210} + d_{220}$ $L_{11} = d_{001} + d_{011} + d_{021} + d_{101} + d_{111} + d_{121} + d_{201} + d_{211} + d_{221}$ $L_{21} = d_{002} + d_{012} + d_{022} + d_{102} + d_{112} + d_{122} + d_{202} + d_{212} + d_{222}$ $L_{02} = d_{000} + d_{001} + d_{002} + d_{100} + d_{101} + d_{102} + d_{200} + d_{202} d_{202}$ $L_{12} = d_{010} + d_{011} + d_{012} + d_{110} + d_{111} + d_{112} + d_{210} + d_{211} + d_{212}$ $L_{22} = d_{020} + d_{021} + d_{022} + d_{120} + d_{121} + d_{122} + d_{220} + d_{221} + d_{222}$ $L_{03} = d_{000} + d_{001} + d_{002} + d_{010} + d_{011} + d_{012} + d_{020} + d_{021} + d_{022}$ $L_{13} = d_{100} + d_{101} + d_{102} + d_{110} + d_{111} + d_{112} + d_{120} + d_{121} + d_{122}$ $L_{23} = d_{200} + d_{201} + d_{202} + d_{210} + d_{211} + d_{212} + d_{220} + d_{221} + d_{222}$.

Relations (4) are obtained according to the following algorithm:

ALGORITHM 2: A procedure for designing a TPC encoder

1. Write down the integers 0 through $r^n - 1$ consecutively;
2. Let there be rn OR gates in front of the integers of step 1 arranged into n groups of r OR gates each so that the outputs of the OR gates correspond together to an integer represented by $L_{ij}$ in which i is a digit in position j for $i=0, 1, \ldots, r-1$ and $j=1, 2, \ldots, n$; and
3. Connect the inputs representing the integers of step 1 to the OR gates of step 2 as indicated by the labelling $L_{ij}$.

FIG. 4 shows direct application to algorithm 2.

Figure 5:
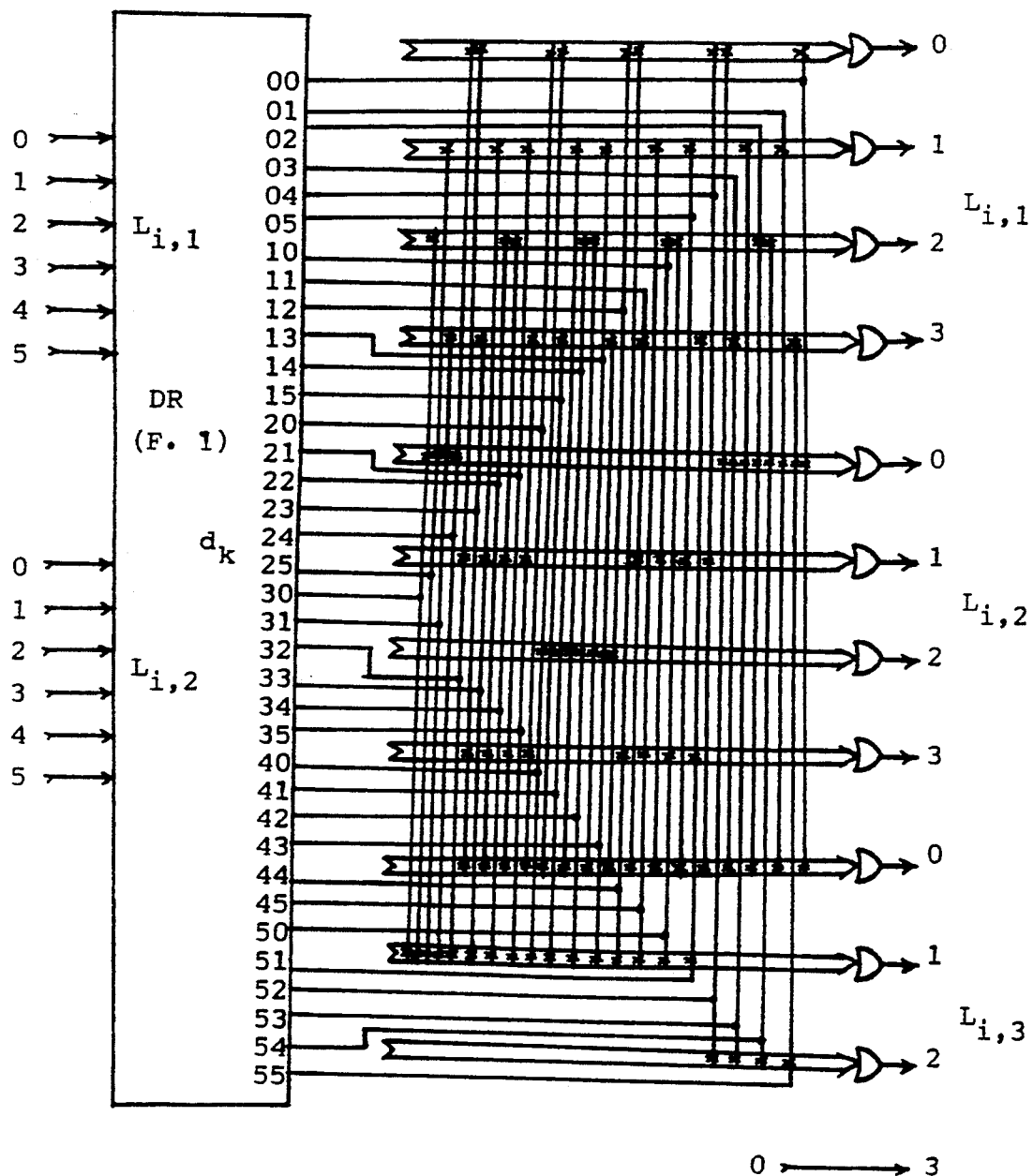
FIG. 5 is a logic diagram of a combinational circuit of a TPC radix converter(RC) for the case n=2, r=6, p=3 and b=4 where n and r are positive integer of a first number system of radix r and p and b are positive integers of a second number system of radix b.

FIG. 5 is a combinational circuit for a TPC radix converter from a first number system of radix r to a second number system of radix b drawn(for the case r=6, n=2, b=4 and p=3) according to the following I/O relations:

$$\begin{bmatrix} d_k = \prod_{j=1}^{n} L_{ij}^1 \text{ such that } i_n \ldots i_2 i_1 = k \\ L_{ij}^2 = \sum_k d_k \text{ such that } k \text{ is an integer between 0 and } m, \text{ included, in which } i \text{ is a digit in position } j \end{bmatrix} \quad (5)$$

where multiplication and summation signs denote AND and OR operators respectively, m is an integer greater than or equal to $r^n$, n denotes how many digits of the first number system of radix r is the width of the input, p denotes how many digits of the second number system of radix b is the width of the output, $L_{ij}^1$ for $i_j=0, 1, \ldots, r-1$ and $j=1, 2, \ldots, n$ denotes the input, $L_{ij}^2$ for $i_j=0, 1, \ldots, b-1$ and $j=1, 2, \ldots, p$ denotes the outputs, $d_k$ denotes an internal variable, and $k=0, 1, \ldots, r^n-1$ with respect to the first number system of radix r and $k=0, 1, \ldots, m$ with respect to the second number system of radix b. Relations (5) are obtained according to the following algorithm which is merely a combination of algorithms 1 and 2 above:

ALGORITHM 3: A design procedure for a TPC radix converter

1. Algorithm 1 given above with respect to the first number system of radix r; and
2. Algorithm 2 given above also with respect to the second number system of radix b and where the outputs of step 1 are the same inputs of step 2.

FIG. 5 shows an illustration for algorithm 3.

Any TPC representation for any n-digit operand of a number system of radix r must be in the form of n-digit by r-bit. For example, the integer 203 of the number system of radix r=4 is represented in the TPC by 0100 0001 1000 which is a TPC representation of 3-digit by 4-bit, i.e., in the form of n-digit×r-bit. The TPC decoder of FIG. 1 converts a number from a TPC representation of the form n-digit by r-bit to another TPC representation of the form one-digit×$r^n$-bit. The TPC encoder of FIG. 4, on the other hand, converts a number from a TPC representation of the form one-digit×m-bit to another TPC representation of the form p-digit×b-bit. Means that the TPC decoder is precisely a TPC radix converter from a number system of radix r to a number system of radix $r^n$ and the TPC encoder is precisely a TPC radix converter from a number system of radix m to another number system of radix b. Choosing m greater than or equal to $r^n$ and combining the TPC decoder and the TPC encoder together simply by connecting the outputs of the TPC decoder to the corresponding inputs of the TPC encoder means that the combination so obtained is precisely a TPC radix converter from a number system of radix r to another number system of radix b. It is that simple. Radix conversion according to this invention is merely a decoding-encoding procedure and accordingly the TPC radix converter of this invention is simply a combination of a TPC decoder and a TPC encoder. The TPC decoder and the TPC encoder are both combinational circuits and accordingly their combination the TPC radix converter is a combinational circuit. Means that radix conversion is reduced from a procedure for evaluating a formula of the type cited in the summary of the invention above where a multi-operation processor may be necessary to a decoding-encoding procedure requires no more than a combinational circuit for its implementation.

What is claimed is:

1. A TPC decoder combinational logic circuit for converting a TPC represented operand of one radix into a TPC represented equivalent value of another radix in a decoding operation in a way where no mathematical computation is required to be implemented by said TPC decoder for performing said decoding operation and accordingly for performing desired conversion of said TPC represented operand into said TPC represented equivalent value, comprising:

an arrangement of AND gates operable for propagating input electrical signals representing said TPC represented operand into output electrical signals representing said TPC represented equivalent value with input terminals connected to said AND gates for receiving said input electrical signals and with output terminals coupled to said AND gates for delivering said output electrical signals wherein said AND gates are pre-arranged so that when said input electrical signals pass through them said, input electrical signals come out decoded into said output electrical signals and wherein:

devices equivalent to said AND gates together with said input terminals and said output terminals and their internal connections are the only circuit elements used in structuring said TPC decoder combinational logic circuit, signals manipulation of said input electrical signals into said output electrical signals is implemented in one way signals passing from said input terminals to said output terminals through said AND gates, said signals manipulation represents desired implementation of said decoding operation, and said implementation of said decoding operation represents said desired conversion of said TPC represented operand of one radix into said TPC represented equivalent value of another radix.

2. The decoder of claim 1 wherein all output terminals correspond to a value equal to or greater than a positive integer m are ORed together.

3. The decoder of claim 1 wherein said operand is a one-digit non-TPC represented operand.

4. A TPC encoder combinational logic circuit for converting a TPC represented operand of one radix into a TPC represented equivalent value of another radix in an encoding operation in a way where no mathematical calculation is required to be implemented by said TPC encoder for performing said encoding operation and accordingly for performing desired conversion of said TPC represented operand into said TPC represented equivalent value, comprising:

an arrangement of OR gates operable for propagating input electrical signals representing said TPC represented operand into output electrical signals representing said TPC represented equivalent value with input terminals connected to said OR gates for receiving said input electrical signals and with output terminals coupled to said OR gates for delivering said output electrical signals wherein said OR gates are pre-arranged so that when said input electrical signals pass through them said input electrical signals come out encoded into said output electrical signals and wherein:

devices equivalent to said OR gates together with said input terminals and said output terminals and their internal connections are the only circuit elements used in structuring said TPC encoder combinational logic circuit, signals manipulation of said input electrical signals into said output electrical signals is implemented in one way signals passing from said input terminals through said OR gates to said output terminals, said signals manipulation represents desired implementation of said encoding operation, and said desired implementation of said encoding operation represents said desired conversion of said TPC represented operand into said TPC represented equivalent value.

5. A TPC radix converter combinational logic circuit for converting a TPC represented operand of a first digital system of radix r into a TPC represented equivalent value of a second digital system of radix b (r and b being positive integers) in a decoding-encoding operation in a way where ·no mathematical calculation is required to be implemented by said TPC radix converter for performing said decoding-encoding operation and accordingly for performing desired conversion of said TPC represented operand of said first digital system of radix r into said TPC represented equivalent value of said second digital system of radix b, comprising:

(a) a TPC decoder combinational logic circuit for converting said TPC represented operand of said first digital system of radix r into a TPC represented intermediate equivalent value of a third digital system of radix m (m being a positive integer) in a decoding operation in a way where no mathematical calculation is required to be implemented by said TPC decoder for performing said decoding operation and accordingly for performing desired conversion of said TPC represented operand of said first digital system of radix r into said TPC represented intermediate equivalent value of said third digital system of radix m, comprising:

an arrangement of AND gates operable for propagating input electrical signals representing said TPC represented operand of said first digital system of radix r into output electrical signals representing said TPC represented intermediate equivalent value of said third digital system of radix m with input terminals connected to said AND gates for receiving said input electrical signals and with output terminals coupled to said AND gates for delivering said output electrical signals wherein said AND gates are pre-arranged so that when said input electrical signals pass through them said input electrical signals come out decoded into said output electrical signals and wherein said input electrical signals are manipulated into said output electrical signals in one way signals passing from said input terminals to said output terminals through said AND gates;

(b) a TPC encoder combinational logic circuit for converting said TPC represented intermediate equivalent value of said third digital system of radix m into said TPC represented equivalent value of said second digital system of radix b in an encoding operation in a way where no mathematical computation is required to be implemented by said TPC encoder for performing said encoding operation, comprising:

an arrangement of OR gates operable for propagating input electrical signals representing said TPC represented intermediate equivalent value of said third digital system of radix m into output electrical signals representing said TPC represented equivalent value of said second digital system of radix b with input terminals connected to said OR gates for receiving said input electrical signals representing said TPC represented intermediate equivalent value of said third digital system of radix m and with output terminals coupled to said OR gates for delivering said output electrical signals representing said TPC represented equivalent value of said second digital system of radix b wherein said OR gates are pre-arranged so that when said input electrical signals representing said TPC represented intermediate equivalent value of said third digital system of radix m pass through them said input electrical signals representing said TPC represented intermediate equivalent value of said third digital system of radix m come out encoded into said output electrical signals representing said TPC represented equivalent value of said second digital system of radix b and wherein said input electrical signals representing said TPC represented intermediate equivalent value of said third digital system of radix m are manipulated into said output electrical signals representing said TPC represented equivalent value of said second digital system of radix b in one way signals passing from said input terminals of said TPC encoder to said output terminals of said TPC encoder through said OR gates; and (c) wherein: said input terminals of said TPC encoder are coupled to corresponding output terminals of said output terminals of said TPC decoder, signals manipulation of said input electrical signals representing said TPC represented operand of said first digital system of radix r into said output electrical signals representing said TPC represented equivalent value of said second digital system of radix b is implemented in one way signals passing from said input terminals of said TPC decoder to said output terminals of said TPC encoder through said AND gates and said output terminals, respectively, of said TPC decoder and then through said input terminals and said OR gates, respectively, of said TPC encoder, said signals manipulation represents desired implementation of said decoding-encoding operation, and said implementation of said decoding-encoding operation represents desired implementation of said desired conversion of said TPC represented operand of said first digital system of radix r into said TPC represented equivalent value of said second digital system of radix b.

* * * * *

UNITED STATES PATENT AND TRADEMARK OFFICE
CERTIFICATE OF CORRECTION

PATENT NO. : 5,402,122

DATED : March 28, 1995

INVENTOR(S) : Moatad S. Al-Ofi

It is certified that error appears in the above-indentified patent and that said Letters Patent is hereby corrected as shown below:

On the Title Page, item [76], inventor's address should read --
P.O. Box 972 Medina, Saudi Arabia --.

Signed and Sealed this

Fifteenth Day of August, 1995

Attest:

BRUCE LEHMAN

Attesting Officer          Commissioner of Patents and Trademarks